United States Patent [19]

Horton

[11] Patent Number: 4,876,050

[45] Date of Patent: Oct. 24, 1989

[54] PROCESS FOR DRY FIBER WINDING AND IMPREGNATING OF PROJECTILES

[75] Inventor: Jack Horton, Marina del Rey, Calif.

[73] Assignee: Murdock, Inc., Compton, Calif.

[21] Appl. No.: 105,653

[22] Filed: Oct. 5, 1987

Related U.S. Application Data

[63] Continuation-in-part of Ser. No. 748,337, Jun. 24, 1985, abandoned.

[51] Int. Cl.$^4$ .................. B29C 35/02; B29C 45/02; B29C 45/14
[52] U.S. Cl. .................. 264/102; 264/236; 264/258; 264/336; 264/328.7
[58] Field of Search .............. 264/101, 102, 103, 136, 264/137, 257, 229, 258, 271.1, 236, 279, 279.1, 336, 347, 328.7; 156/175; 428/377

[56] References Cited

U.S. PATENT DOCUMENTS

| | | | |
|---|---|---|---|
| 2,356,081 | 8/1944 | Norotng | 264/336 |
| 3,654,009 | 4/1972 | Judd | 156/173 |
| 3,743,561 | 7/1973 | Koontz | 264/263 |
| 3,843,759 | 10/1974 | Keeham | 264/137 |
| 3,954,379 | 5/1976 | Klocke | 425/505 |
| 4,460,531 | 7/1984 | Harris | 264/258 |
| 4,515,547 | 5/1985 | Rother | 264/257 |
| 4,540,536 | 9/1985 | Altmann | 264/102 |

OTHER PUBLICATIONS

"Advanced Composites", Filament Winding: Beyond the Symmetrical, Jan./Feb. 1987, pp. 30–38.

Primary Examiner—James Lowe
Assistant Examiner—Jeremial F. Durkin, II
Attorney, Agent, or Firm—George F. Bethel; Patience K. Bethel

[57] ABSTRACT

A process for dry fiber winding in the absence of resin and subsequent resin impregnating of objects such as projectile bodies having a recessed area for receiving the windings. The process includes winding the projectile body with dry glass or other dry fibers in the absence of resin, placing the wound projectile body into a heated mold, applying a vacuum, pressure injecting a metered amount of resin into the mold, applying pressure to the resin by means of a pressurized ram to impregnate the fibers, allowing the resin to cure to the gel stage within the mold, removing the projectile body from the mold without distrubing the gel surface, and completing cure of the resin at room temperature or in a curing oven.

9 Claims, 4 Drawing Sheets

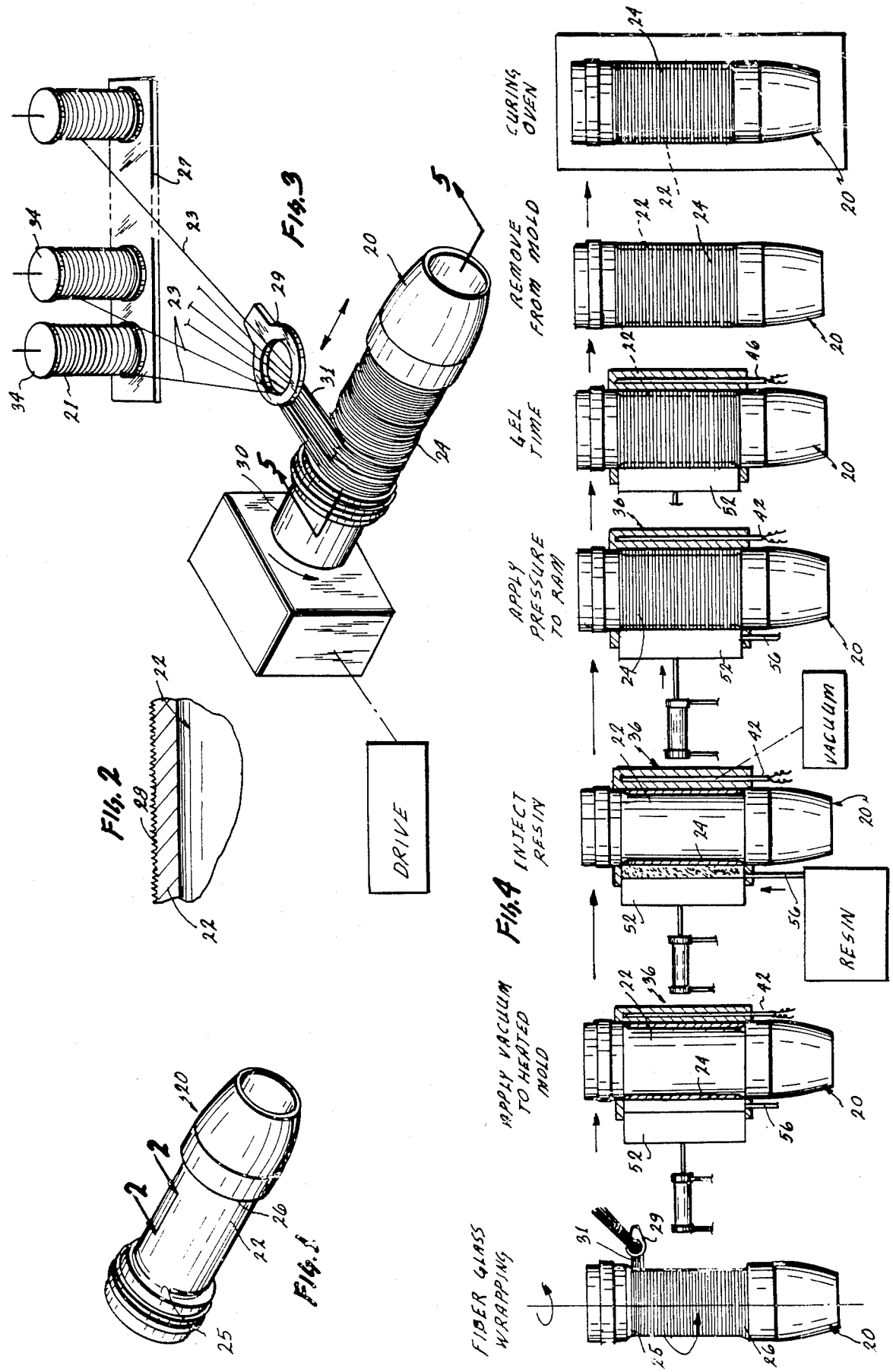

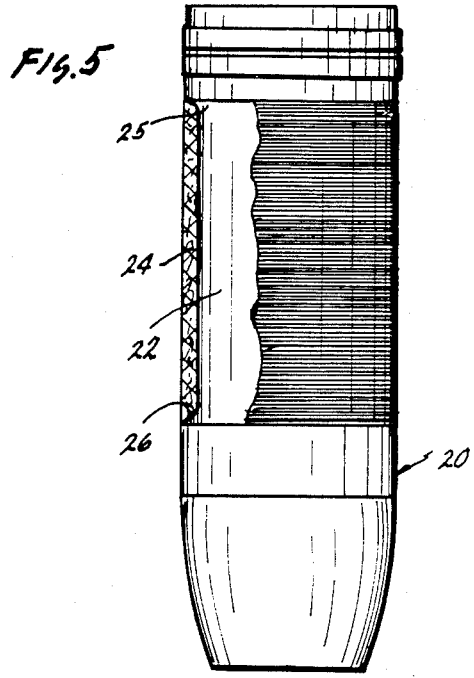
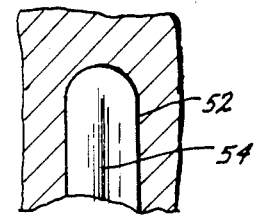
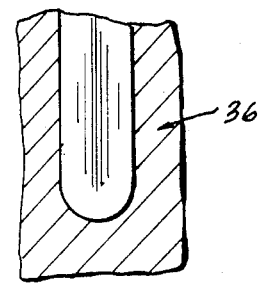
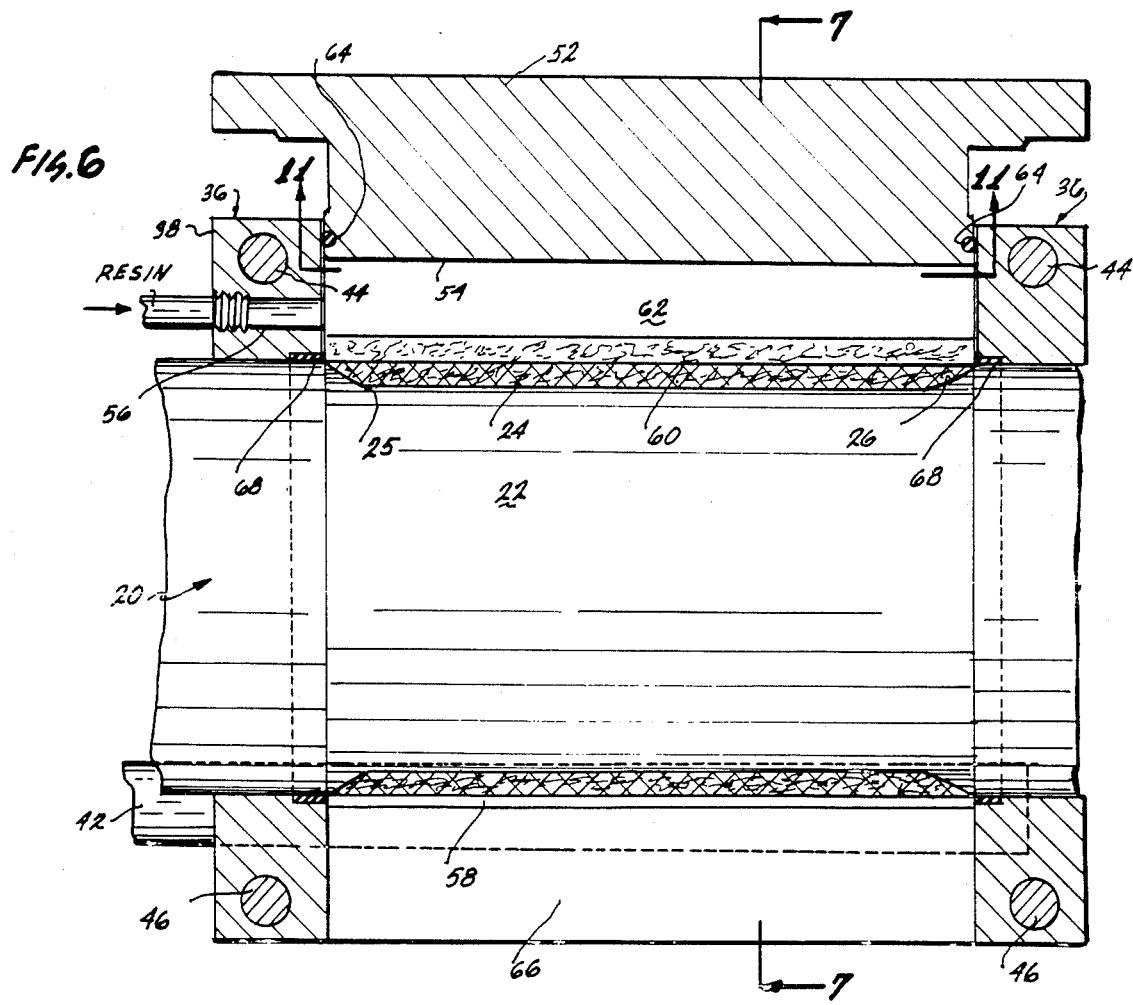

PROCESS FOR DRY FIBER WINDING AND IMPREGNATING OF PROJECTILES

This is a continuation-in-part of Ser. No. 748,337, entitled Fiber Resin Wrap Process, Product and Apparatus, filed June 24, 1985, now abandoned.

FIELD OF THE INVENTION

This invention relates to a process, product and apparatus for producing dry fiber wound resin impregnated products and particularly to a process for making glass fiber resin impregnated objects.

BACKGROUND OF THE INVENTION

A new design for projectile bodies in recent years includes a section of the metal casing recessed below the normal surfaces of the projectile body diameter. The recessed area is wound with glass fibers which have been pre-wetted with resin to a level above the adjacent projectile body surfaces followed by curing. The winding is accomplished by passing the glass fibers through a dip tank containing the resin binder prior to winding it around the recessed area on the projectile body. Most excess resin is removed from the glass fibers during the winding process.

In order to prevent unwanted contact of the resin with all other parts of the projectile body, the area above and below the recessed area must be completely masked.

After completion of the winding with the resin impregnated glass fibers, the projectile body is transferred to a curing oven to cure the resin. Since a smooth surface is necessary for avoidance of ballistic problems, the glass fiber resin impregnated area requires machining on a lathe or grinding after cure. This is necessary to reduce the diameter of the resin glass fiber wound area so that it corresponds to a specific diameter within a tolerance of 0.020 which is less than the existing diameter of the adjacent portions of the projectile body.

The above process suffers from several drawbacks, including the fact that the final machining on the lathe or grinder often damages the surface of the glass-resin laminate and/or the phosphated coating on the projectile body casing. This requires refinishing of the metal surfaces or removal and replacement of the fiber-resin laminate. Also, in order to fulfill the mechanical and physical requirements, it is necessary to machine off approximately 30% to about 40% of the glass fiber resin material after cure. This results in increased cost.

In addition, the process has proved to be excessively time consuming as well as costly due to the separate steps required in the masking, machining, mask removal, and refinishing of the projectile body.

SUMMARY OF THE INVENTION

In order to overcome the foregoing disadvantages of the prior art processes, a novel process is provided in which the recessed area of the projectile body is precision dry wound with fibers in the absence of resin. The dry fiber wound projectile body is implaced in a split mold designed in such a way as to cover and configure only the area around the fiber winding. The interior of the mold is designed to be concentric with and preferably be slightly less than the diameter of the projectile body in its finished configuration and to a size which will produce the required specific diameter within tolerance..

The split mold, which is heated, for example by means of electric cartridge heaters has a vacuum applied to it prior to and during the time that a metered amount of resin is injected into one end of the mold between a ram forming a contact part of the mold and the dry glass fiber windings or into an injection port for metered pump injection. The application of the vacuum continues during the time that pressure is applied to the ram which transfers that pressure to the resin. The pressure of the ram against the resin forces the resin to impregnate the interstices of the dry fibers. This results in the thorough impregnation and wetting of the fibers with the resin. At the same time air and other gases are withdrawn by the vacuum avoiding bubbles in the resin and increasing adhesion between the resin, fibers, and projectile body surfaces.

The projectile body with the fiber impregnated resin remains in the heated mold just long enough to bring the resin to the "gel" stage. The gel stage is defined as the advancement of the resin to the stage where the viscosity is almost a solid. As a practical matter, the cure should proceed to the gel stage where it is possible to open the mold and remove the projectile body without disturbing the surface of the gel. This can take place in as little as 200-400 seconds at temperatures in the range of about 200-250 degrees F. for certain epoxy types of resin. The exact time and temperature depends upon the nature of the resin and the amount of the hardener which can reduce gel times even more than the above.

When the gel stage has been reached, the mold is opened and the projectile body is removed. Cure can be completed at ambient temperatures or the projectile body can be transferred to a curing oven for a time and at a temperature sufficient to cause a complete cure to take place. For example, this can be accomplished in about forty-five minutes to an hour at a temperature in the range of about 150-230 degrees F. for an epoxy type resin.

The surface of the fiber resin wound area forms a smooth surface. The molding can be made concentric with but of a lesser diameter than the adjacent outer metal surface portions of the projectile body so that the finished projectile body requires little if any further processing.

Not only is subsequent machining on a lathe or grinder avoided and removal of masking eliminated by this method, but also less resin and fiber are required. This results in reduced cost, as well as decreased processing time, which also reduces production costs.

A novel split mold is also provided by the invention. The mold is designed to be coextensive with the fiber wound area and is sealed to the metal surfaces above and below the fiber wound area, avoiding resin contact in undesired areas. This avoids the need for refinishing of the phosphate coating on the metal surfaces.

The split mold also includes a ram coextensive with the fiber wound area, the contact surface of which forms a portion of the interior surface of the mold. A very narrow slot or recession in the mold permits a vacuum to be applied to the mold prior to and during the resin injection step.

The products made by the claimed process in conjunction with the split mold, and a related apparatus are also provided which permit the molding of a plurality of fiber wound projectile bodies. The apparatus is in the form of a wheel having spoke-like extensions from a central hub, each spoke corresponding to a split mold according to the invention. Rotation of the apparatus permits the continuous molding of a plurality of projectile bodies by sequentially loading, injecting and curing to the gel stage followed by unloading. This allows for increased production and more efficient use of manpower and molding equipment.

Another apparatus is in the form of a press complete with pressure air bags, location mechanisms for die and projectile, transfer apparatus for vacuum nozzle, transfer apparatus for resin injection nozzle, heated dies and resin injection, metering, mixing, heating, degassing and pressure pumping equipment.

An automated conveyor transports projectiles to one of a plurality of presses that are needed for the required production. One press can produce a projectile in 5 minutes or less, floor to floor time.

BRIEF DESCRIPTION OF THE DRAWINGS

The invention will be more clearly understood wih reference to the attached drawings in which:

FIG. 1 shows a perspective view of a projectile body having a recess for fiber winding;

FIG. 2 shows a hyperbolic fragmented section of the surface of the recess of the projectile body of FIG. 1 as shown in the direction 2—2 of FIG. 1;

FIG. 3 shows a schematic illustration of the winding of the recess of the projectile body with dry glass or other dry fibers;

FIG. 4 shows a schematic flow chart of the process of the invention;

FIG. 5 shows a partially broken away view of the fiber winding as shown in the direction 5—5 of FIG. 3;

FIG. 6 shows a cross section of the split mold of the invention with a fiber wound projectile body implaced therein;

DETAILED DESCRIPTION OF THE DRAWINGS

Figure 7:
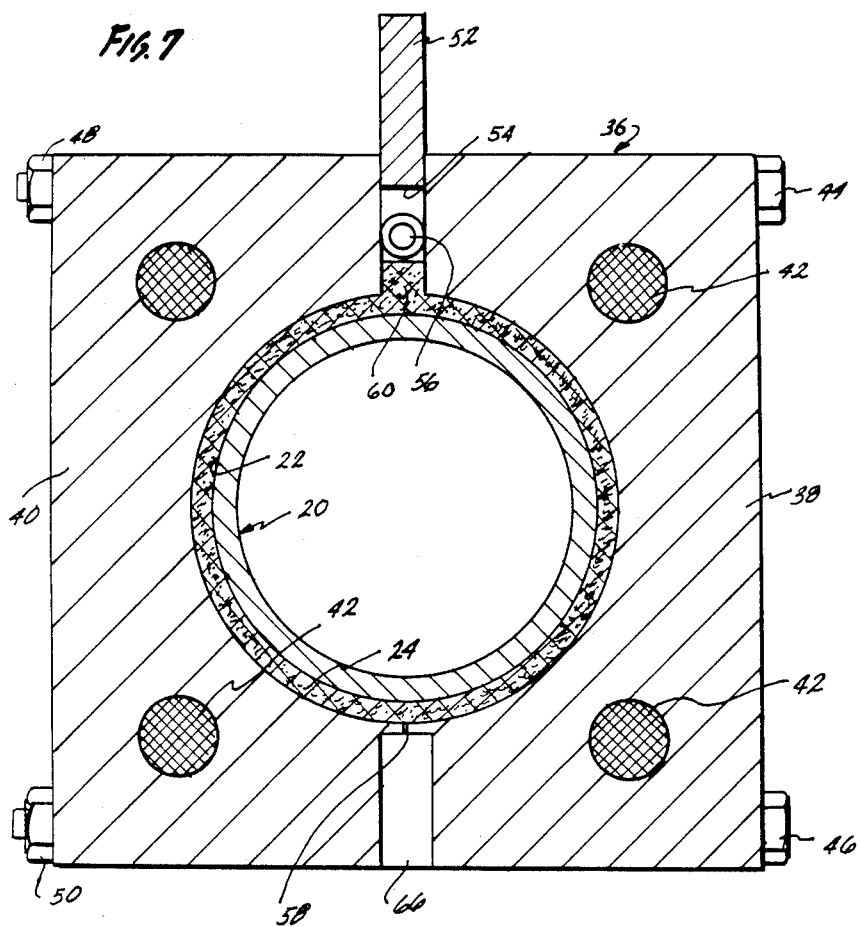
FIG. 7 shows a section taken through the lines 7—7 of FIG. 6.

As used herein and in the appended claims:

"Wind" refers to the action of encircling with a fiber or fibers to bind with multiple loops of said fiber or fibers;

"Filament" refers to a single continuous man-made fiber produced from a liquid bath as by extrusion through a small orifice and used either in the form of a monofilament or in groups for textile yarns with little or no twist or for cordage;

"Strand" refers to fibers or filaments twisted, plaited or laid parallel to form a unit for further twisting or plaiting into yarn, thread, or the like;

"Roving" refers to a slightly twisted roll or strand of textile fibers.

"Dry fibers" refers to fibers which have not been pre-wetted with resin.

Referring to FIG. 1 of the drawings, there is shown a projectile body 20 having a recessed area 22 for receiving dry glass or other fiber winding 24 as shown in FIG. 5. As shown, the recessed area 22 defines an area of the projectile body 20 which has been machined below the normal surfaces of the projectile body diameter to one which is 0.0555 inch below the surface of the normal circumference of the projectile body.

It can be seen that the recessed area 22 extends circumferentially around the projectile body 20 and is defined by end regions 25 and 26 which are normal to the longitudinal axis of the projectile body. The end regions 25 and 26 are characterized by being tapered from the bottom of the recess 22 and increase in diameter to the normal surface of the projectile body 20.

The recess 22 in the projectile body 20 is formed by machining. An enlarged detailed view of the surface of the recess 22 is shown in FIG. 2 where the machine marks 28 which run normal to the axis of the projectile body 20 are shown. The surface of the projectile body 20 is provided with a phosphate coating which is not shown in the drawings. In the course of the winding of the dry glass or other fibers around the recessed area 22, the machine marks 28 act to aid in the precision winding of the fibers within the recess 22, as well as to improve the points of binding between the resin, the metal surface, and the fibers.

One method of winding the glass or other fibers within the recessed area is indicated in FIG. 3. As shown, the projectile body 20 is held on a mandrel 30 which is driven by a motor 32. By rotation of the projectile body 20, the recessed area 22 can be wound with the dry glass or other dry fibers 23. The glass fibers 23 in the form of filaments are fed from individual forming packages 21, each package containing one continuus strand of glass filaments. The forming packages 21 can be held in a creel not shown from which the plurality of strands are fed through a ring 29 forming a band 31 of strands. Movement of the ring 29 back and forth in a direction parallel to the central axis of the projectile body 20 controls the winding. Controlled tension of the strands being wrapped is required and provided by tension. Tension metering apparatus can be used to achieve the required number of windings and the density to meet the required diameter and specifications. As shown, the fibers are wound normal to the axis of the projectile body 20 to increase the hoop strength thereof.

The exact manner of winding as shown in the drawing of FIG. 3 is only intended to be illustrative of one way of accomplishing the winding of the dry fibers 23 around the recessed area of the projectile body 20. Various fiber winding machines are commercially available, and thus, the exact choice is not critical to the process of the invention herein. The important thing is that the precise weight of dry fibers be wound in a precise manner to provide a parallel wind to a precise diameter which is normal to the longitudinal axis of the projectile body 20. Numerous ways of accomplishing this will be apparent to those experienced in the art and can be resorted to without departing from the spirit of the invention.

It should also be mentioned that while the parallel winding is preferred for the winding of the projectile body, other types of winding are acceptable for other types of fibers or glass fiber resin impregnated winding for objects other than projectile bodies and the particular application of this invention. The parallel winding is preferred in this instance to provide hoop strength to the finished product. Thus, if hoop strength is not desired and strength is to be distributed isotropically, other methods and angles of winding can be resorted to within the bounds of the invention.

The wound projectile body is shown in FIG. 5 prior to the implacement of the projectile body into the novel split mold 36 of the invention.

Figure 9:
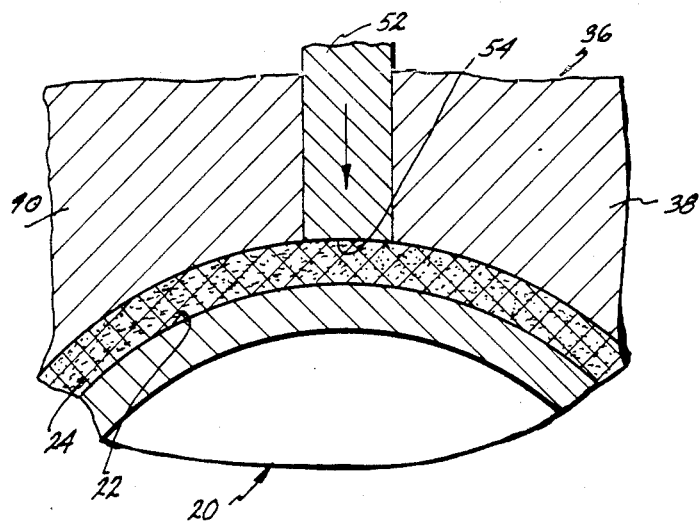
FIG. 9 shows the ram at the end of its path of movement when it is applying pressure to the resin and illustrates its function as an extension of the mold.

The split mold 36 of the invention is shown in FIGS. 6 and 9. By referring to FIG. 7 it can be seen that the mold 36 is comprised of two major sections 38 and 40 which contain electric cartridge heaters 42 for maintaining a specific temperature within the mold.

The two halves 38 and 40 of the mold 36 can be held together by means of bolts 44 and 46 which extend through the mold 36 outside of the molding area where the mold is clamped against the projectile body 20. The bolts 44 and 46 are secured by means of nuts 48 and 50. Other means can also be used which will be obvious to those skilled in the art.

The projectile body 20 is implaced within the mold 36 in such a way that the recessed area 22 with its corresponding glass fiber winding 24 is entirely contained within the mold 36. The mold parts 38 and 40 are tightly clamped against the surfaces adjacent the tapered ends 25 and 26 of the projectile body 20 through the action of seals 68. The seals 68 can be of any resilient material which will compress upon closing of the mold and which is also resistant against resin adherence. "Captan" rubber seals are adequate for this purpose. The seals 68 can be seen in FIG. 6 in some detail.

The mold halves 38 and 40 can correspond to greater than, equal to, or preferably slightly less than the outer dimensions of the projectile body 20 which extend above and below the recessed area 22. In this manner, the final specific dimensions of the wound recessed area which is subsequently injected with a metered amount of resin forms a respective smooth surface which is respectively greater than, equal to, or slightly less than but concentric with the outer diameter of the projectile body 20. In the example shown in the drawings, the finished diameter of the resin fiber wound area is about 0.031 inch less than the diameter of the projectile body 20.

The mold 36 includes a ram 52 which extends lengthwise of the mold 36 in a direction which is parallel to the axis of the projectile body 20. The ends of the ram 52 are rounded as shown in FIG. 11. Surrounding the ram 52 is an O-ring 64 as shown in FIG. 6. The O-ring 64 surrounding the ram 52 precludes escape of resin during pressurizing of the ram 52.

By a particular feature of the invention, the ram 52 has a contacting surface 54 which forms a part of the interior surface of the mold when at the end of its path of travel or movement. The contacting surface 54 of the ram 52 corresponds to the exact curvature of the other interior mold surfaces. In this manner, when the ram 52 has travelled to the end of its path of movement and is in contact with the resin surfaces of the fiber wrapped area, it acts as an extension of the interior of the mold 36.

As indicated in FIG. 6, a metered amount of resin which has been premixed with any required hardener or other catalyst is injected under pressure into the mold 36 through a port 56. The resin is indicated at 60 in FIGS. 6 through 9.

The mold 36 is further provided with a very narrow slot 58 for the application of a vacuum prior to and during the resin injection and subsequent application of pressure to the ram 52. The slot 58 is located opposite the ram 52 and also extends the length of the fiber wrapped area 24 and is parallel to the central axis of the projectile body 20. The slot 58 opens into a plenum 66 within the mold 36 for application of a vacuum not shown.

As shown in FIG. 6, the resin 60 is injected into a space or cavity 62 formed between the contact surface of the ram 52 and the glass fiber winding 24. As soon as the resin 60 has been injected through the port 56 into the cavity 62, pressure is applied to the ram 52 by a means not shown in the drawings. The vacuum applied through the slot 58 is continued during injection and subsequent cure to the gel stage. As shown especially in FIGS. 8 and 9, the combination of the vacuum and pressure on the ram 52 which is transferred to the resin 60 causes the resin 60 to be simultaneously forced and drawn through the interstices of the glass fiber winding 24 to extend and penetrate evenly all the way around the recessed fiber wound area 24.

Figure 8:
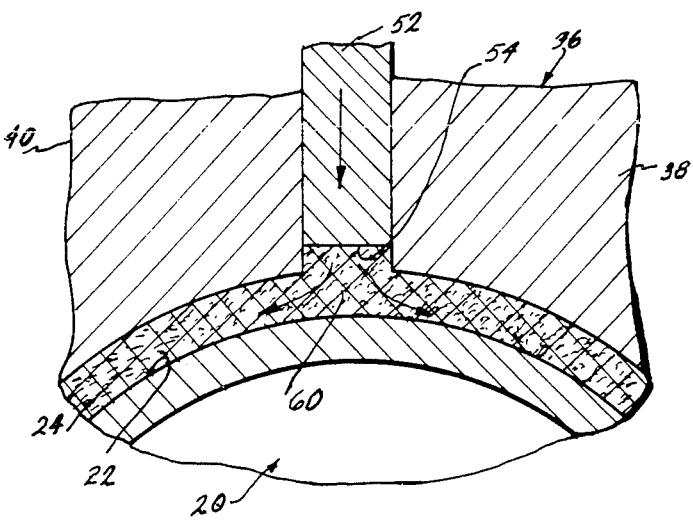
FIG. 8 shows an enlarged detailed view of the split mold during the application of pressure to the ram.

The position of the ram 52 in its starting position of movement during injection of the resin 60 is shown in FIG. 8. Its final position of travel is shown in detail in FIG. 9. As shown, the resin 60 has thoroughly wetted and contacted the glass fiber winding 24 and fills the space between the recess 22 and the interior surfaces of the mold 36. It can also be seen that the contacting surface 54 of the ram 52 forms a continuation of the mold 36 which is in contact with the resin impregnated glass fiber wound area 24.

Since the mold 36 is heated, after injection and application of pressure as above described, the resin 60 quickly advances to the gel stage. Most preferably, the resin advances to a medium gel stage which can be defined as a state of partial solidity, enabling the projectile body casing to be removed from the mold without disturbing the gel surface of the resin impregnated glass fiber wound area.

When the gel stage has been reached, the mold 36 is opened and the projectile body 20 removed. It is then allowed to cure at ambient temperature or transferred to a curing oven not shown where final curing of the resin takes place.

Figure 10:
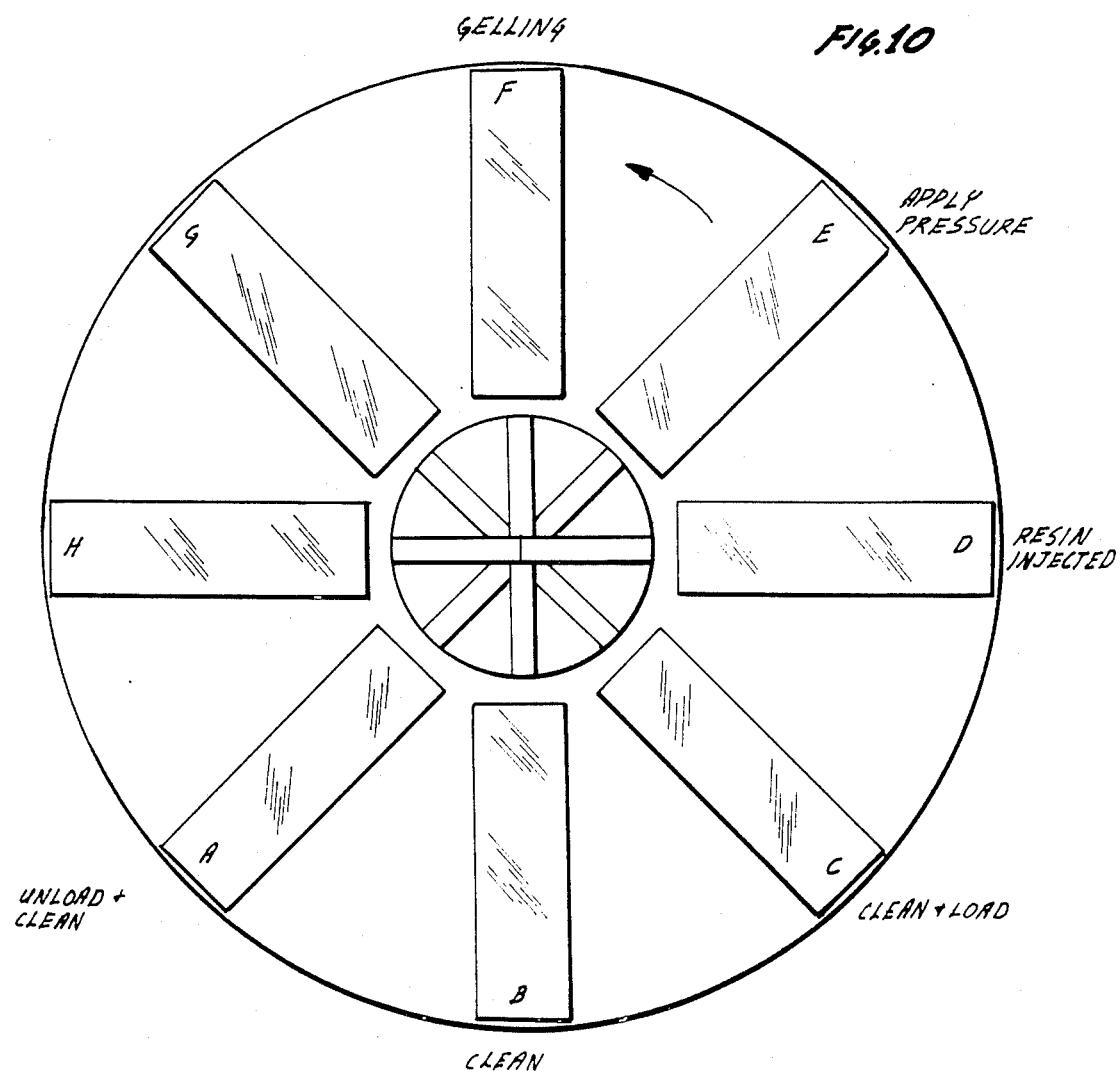
FIG. 10 shows a schematic representation of one apparatus which permits the continuous production of the dry fiber wound resin impregnated projectile bodies; and, FIG. 11 shows a detailed view of the contact surface of the ram.

The apparatus shown in FIG. 10 illustrates a device 62 for the continuous resin impregnation and molding to the gel stage of previously dry glass fiber wound projectile bodies. It consists of a multiplicity of split molds 36 arranged around a central hub 64.

As shown, at Station A, assuming that the process is already in progress a molded projectile body 20 which has been advanced to the gel stage, is unloaded from the mold 36. The metal to metal mold surfaces are then cleaned by wiping out at station B. A wrapped projectile body is loaded at station C, and injected with resin and pressure applied to the resin through the ram at station D.

Compression and cure to the gel stage continues at the remaining stations E through F. This complete the molding cycle for only one projectile body. Several projectile bodies can be molded sequentially by loading and injecting of separate fiber wound projectile bodies while another wound projectile body is being cured to the gel stage and another is being unloaded.

Winding the projectiles with dry fibers coupled with injection molding under vacuum produces a product having a greater density of fibers than by use of fibers pre-wetted with resin. Thus, laminates produced by the method of the prior art employing fibers prewetted with resin prior to winding consisted of 40% by weight fiber and 60% by weight resin. Using the dry fiber winding process of this invention permits the use of 70–80% by weight of fibers and 30% to 20% by weight resins. Furthermore, a high quality, clear laminate is produced since air bubbles are avoided through use of the vacuum. This provides greater strength to the laminate.

PROCESS OF THE INVENTION

The first step in the process of the invention includes providing a projectile body or other object to be wound with fibers.

While the drawings illustrate winding of a projectile body having a recessed area, it should be understood that the process is not limited to the winding of projectile bodies or to objects having recessed areas. Thus, the process can be used to fiber wind objects having a normal unrecessed surface of varying shapes. The objects having the dry fiber winding can then be placed in a split mold which is designed to exactly configure to the desired outside dimensions of the final product, and the remaining process steps followed.

Examples of objects which can be wound in lieu of projectile bodies include among others, those which are made of cardboard or wooden tubes for simple pipe, or blow molded thermoplastic parts for pressure vessel production. Other objects can be made of steel and aluminum. The finished products can include pressurized gas cylinders, automobile body parts, various containers, toys, appliance housings and the like.

In the example shown in the drawings, the area to be wound on the projectile body is recessed approximately 0.0555 inch below the surface of the normal circumference of the projectile body.

The recessed area 22 in the example shown in the drawings is approximately 7 inches along its length and includes a tapered shoulder 24 and 25 at each end. The presence of the tapered shoulder within the recessed area has the effect of increasing the bonding between the resin, glass fiber, and the surface of the machined area.

Within the recessed area a multiplicity of lands and grooves which are a result of the machining of the projectile body. These act to increase the bonding strength of the final resin glass fiber winding by providing increased surface area for bonding sites.

The next step of the process includes winding with fibers. Before winding, the surface to be wound should be primed preferably by coating with a linking agent which is compatible with the resin system or at least by degreasing of the surfaces to insure proper bonding between the metal or other surface and the resin.

In the production of projectile bodies according to the invention, it is preferred to use glass fibers, as a consequence, the invention process is described using glass fibers. It should be understood, however, that other fibers can be used in place thereof as desired, for example in instances and applications depending upon the finished requirements of a strength and the final use intended for the molded product.

Examples of the fibers which can be used in the invention process include but are not limited to those made of glass, polyester, carbon, aramid, hybrids of carbon-aramid, hybrids of aramid-glass, hybrids of aramid-glass-carbon, and hybrids of carbon-glass as well as combinations thereof. These fibers are available in the form of continuous strand roving, woven roving, woven fabric, reinforcing mat, chopped strands and the like.

Whatever fiber is utilized in the invention process, it is preferred that the fiber be treated with a chemical surface treatment or sizing such as cross-linking agent or coupling agent to facilitate processing, to aid in maintaining fiber integrity, and in some instances to establish compatibility with specific resin systems. The exact surface treatment will depend upon the identity of the fiber being used as well as the resin employed.

In the winding of the projectile bodies according to the invention process, a very high quality of glass fiber filaments are preferred. A fiber strand contains a group of filaments from about 50 to more than 4000 filaments. The strand is collected in a single strand roving or a multi-strand roving which conventionally contains 8 to 60 strands. Roving of both types are collected into forming packages which are held in a creel for feeding to a winding device. Single strand roving gives excellent results for the winding of projectile bodies. An example of single strand glass fiber roving which can be used is "Type 30" available from Owens Corning Fiberglas.

Glass fiber filament diameter is standardized in the industry and is identified by a code letter which defines its nominal diameter. Each increase in diameter of 0.00005 inch is defined by a sequential alphabetical code letter. Most commonly available filaments and their filament diameter expressed in 0.00001 inch include code letters: G/35–40; H/40–45; J/45–50; K/50–55; L/55–60; M/60–65; N/65–70; P/70–75; S/85–90; and T/90–95. Of the above described filaments, those having code letters G, H, J, K, L and M are most preferred. Roving yield ranges from about 113 yds. to about 1000 yds./lb. and is preferably 200–750 lbs per pound. Excellent results have been obtained with 250 yards per pound.

The glass fibers most preferred are preferably S glass and E glass (electrical glass) fibers, which are to be distinguished from the filament types described above. S glass has a tensile strength of about 650,000 p.s.i. and a modulus of elasticity of 12.4 million p.s.i. while E glass fibers range in diameter from 0.0001 in. to 0.001 in., have a tensile strength of 500,000 p.s.i. and a modulus of elasticity of 10.5 million p.s.i. The composition of E glass is given below:

| E Glass Composition | |
| --- | --- |
| Compound | % By Weight |
| $B_2O_3$ | 5–10 |
| CaO | 16–25 |
| $Al_2O_3$ | 12–16 |
| $Si_2O$ | 52–56 |
| MgO | 0–5 |
| $Na_2O$ and $K_2O$ | 0–2 |
| $TiO_2$ | 0–0.8 |
| $Fe_2O_3$ | 0.05–0.4 |
| $F_2$ | 0–1.0 |

The fibers are preferably obtained with a surface treatment or sizing for use with a specific resin system. Since the preferred resin system is an epoxy system the strands are preferably treated with a size compatible with epoxy resin.

In the specific application of the winding of projectile bodies, it is important that the winding take place in a precise manner to provide a parallel winding which is normal to the longitudinal axis of the projectile body or cylinder. During the winding process, the winding is laid essentially parallel with little or not twist. This type of winding improves the hoop strength of the finished product.

The number of passes of the glass fibers depends upon the glass weight and other specifications. The other considerations are the desired thickness as measured by the weight, the weight being related to the yield and the yield to the thickness. In the examples shown in the drawings, there is produced a winding having a thickness slightly less than the 0.0555 inch depth of the recess. This is accomplished by using 5-10 bobbins or forming packages each providing a single strand containing multiple filaments, each of the strands being gathered into a band as shown in the drawings by means of a ring. On an average, it requires about 15 passes with one strand of the 250 yards per pound yield to complete the winding step.

Various methods of winding of fibers especially filament winding are known to those skilled in the art. "Filament winding" refers to a process that employs a series of continuous, resin-impregnated fibers applied to a rotating mandrel. Filament winding is distinguished from the claimed process in that resin-impregnated fibers are used in Filament Winding and dry fibers are used in the claimed process. The precision winding techniques used in Filament Winding can be used in the claimed process employing dry fibers.

Those techniques which are most common employ three basic machine concepts: the classical helical/circumferential winder with multi-axis capability, the polar wrapper, and the oscillating mandrel type. In all of these types, the mandrel rotates whil the filaments are moved by means of a traversing carriage. Computer programs can be utilized to control band width, winding angle, winding diameter, number of layers, length of winding and the polar diameter.

A detailed discussion of the precision winding techniques used in filament winding can be found in the *Modern Plastics Encyclopedia* 1980-81 at page 388, published by Modern Plastics, 1221 Avenue of the Americas, New York, N.Y. 10020.

In lieu of the techniques of precision winding, fibers can be wound around the object or mandrel in any convenient manner if precision winding is not required. Thus, hand winding, winding with tape, ribbon, or layering with mat can be resorted to within the scope of the invention.

Similarly, while the drawings show rotation of the object during winding, the reverse can also be resorted to by keeping the object stationary while winding the fibers.

In some instances, where it is important to speed up the processing of the fiber wound objects, it has been found to be advantageous to heat the fibers, for example by blowing them with heated air, during the winding process. Some of this heat is retained by the fibers if the dry fiber wound object is immediately molded after winding. In this manner less heat is required in the mold or resin and processing time can be shortened.

Upon completion of the winding, the projectile body is placed into a split mold having a narrow slot for the application of a vacuum as shown in the drawings. The vacuum is preferably applied as soon as the mold is closed and prior to the injection of resin. It has been found that for the specific application shown in the drawings that a 10 second application of vacuum gives excellent results. The vacuum aids in dispersal of the resin throughout the fibers and permits evacuation of any displaced air or gases produced during the resin injection and subsequent reaction to the gel stage.

The inside of the die including the contact surface of the ram should be coated witha permanent release agent, such as for example a TEFLON type of coating. The use of a temporary release agent is not desirable since it might interfere with any subsequent painting or other surface finishing which might be desired.

As shown in the drawings, the mold is sealed to the chamfer through the seals 68 so that it can clamp against the surface of the projectile body above and below the fiber wound area.

When the projectile body has been replenished within the mold and a vacuum appied for about 10 seconds, a precise, metered amount of resin and hardener which has previously been mixed, degassed, and heated is injected under pressure into the cavity formed between the glass fiber winding and the ram. Best results have been obtained with pressure injection of the resin into the mold.

The type of resin which is selected for use in the present invention will depend upon the type of fibers employed, the use for which the final product is intended, and the type of object which is being molded.

Resins which can be used include but are not limited to thermoset type resins such as epoxies, polyesters, silicones, phenolics, alkyds, diallyl phthalate homopolymers, melamines, polyurethanes, urea resins, and polyimides. Important considerations in the selection of a resin include: a low viscosity to permit it to flow around the fibers, low shrinkage upon cure, low or no production of volatiles, and capability of reaching the gel stage as above defined.

Among the resins mentioned above, the resin which is most preferred in the process for making projectile bodies is an epoxy type of resin. As a family of resins epoxies exhibit low shrinkage on cure, no by-products of cure, chemical and environmental resistance, good adhesion to a variety of substrates, low viscosity, and the resulting high strength to weight ratio of composites with fibers.

The more common liquid epoxy resins are made by a glycidation reaction with an epoxy compound, such as epichlorohydrin with a hydroxyl, usually a dihydric phenol, such as 2,2-bis(p-hydroxyphenyl) propane (bisphenol A), an acid or an amine group. This type gives excellent results in the invention process.

Epoxy novolac resins are produced by glycidation of the low-molecular-weight reaction products of phenol or cresol with formaldehyde. These resins exhibit better elevated temperature performance than common epoxies.

Cycloaliphatic epoxy resins are produced by epoxidation of cyclic olefins, usually with peracetic acid, and by glycidation of an acid such as tetrahydrophthalic acid. These resins exhibit low viscosity and good weathering and arc-tracking resistance.

Other types of epoxies include among others aliphatic epoxy resins, brominated epoxy resins (flame retardant), high-functionality epoxy resins and high molecular weight, linearized epoxy resins.

Reaction of the epoxy resins with a curing agent or hardener transforms it into a thermoset polymer. Curing takes place usually by one of two mechanisms: coupling through a reactive intermediate or direct coupling through the epoxide group by a catalytic homopolymerization.

The first type of curing agent includes active hydrogen compounds which cure by polyaddition reaction. Examples include among others aliphatic polyamines and derivatives of these amines which cure epoxy resins at room temperature. Specific compounds include diethylenetriamine, ketimines, cycloaliphatic amines, and polyamides.

Aromatic amines such as 4,4'-methylene dianiline and meta-phenylenediamine can be used but are less reactive than the above mentioned aliphatic amines and require elevated temperatures for cure.

Another type of curing agent commonly used is acid anhydrides such as methyltetrahydrophthalic anhydride and Nadic methylanhydride. Usually an elevated temperature is required for cure.

Cure by homopolymerization of the epoxide group can be achieved by use of catalysts such as dicyandiamide, tertiary amines such as benzyldimethylamine, and Lewis Acids or Lewis Bases such as boron trifluoridemonoethylamine. Elevated temperatures are required for cure.

Melamine-, phenol-, and urea-formaldehyde resins can be utilized to crosslink through the hydroxyl groups of the epoxy resin. Cure also requies elevated temperatures.

In addition to the epoxy resin/curing agent system, there can also be included, as required depending upon final cured product performance, adjuvant materials such as accelerators, fillers, reinforcements, and mono- or difunctional glycidyl ether diluents.

Examples of commercially available epoxy resins include:

those available from Dow Chemical Corporation under the name "DER 330" (a low viscosity liquid epoxy of the bisphenol A-epichlorohydrin type having an epoxide equivalent weight of 177–188, a viscosity at 25 degrees C. of 7,000–10,000 CPS, a Gardner color Max of 3, and a weight of 9.7 lbs./gal) with a curing agent, "ARCON H-D8" (2-ethyl hexoic acid salt of 2,4,6,tri-(dimethylaminomethyl)phenol) available from Allied Resin Corporation preferably used in the proportions of 100 parts by weight of resin with 10 to 13.5 parts by weight of the curing agent;

those epoxy resins available from E. V. Roberts and Associates under the tradename "RFC-1028" together with a curing agent available from Shell Chemical Company under the tradename "V-40" preferably combined in the amount of 33 parts by weight of the curing agent to 100 parts by weight of the resin; and, those available from Shell Chemical Company especially an epoxy resin sold under the tradename "Epon Resin 9301" which should be used with a curing agent sold under thetradename "Epon Curing Agent CA 9350" preferably in the amount of 8 parts by weight of the curing agent to 100 parts by weight of the resin.

The preferred proportions of glass fiber and resin are about 50% to about 80% glass fiber and the balance, about 50% to about 20% resin. Most preferably the proportions lie in the range of about 65% to about 85% glass fiber and the balance, about 35% to about 15% resin. Minimum requirements for a projectile body include at least 65% glass fiber. Excellent results have been obtained using 72% glass fiber and 28% resin by weight. A high glass content is desired to avoid shearing and is also desirable to reduce cost.

The resin is injected into the mold cavity between the fiber winding and the interior mold surfaces as indicated in the description of the drawings. Injection pressures normally range between 30 p.s.i. and 100 p.s.i. depending on resin and other process conditions.

It is important that a precise metered amount of the resin premixed with the hardener or curing agent be injected into the mold so that the exact amount of resin required will be available. If too little resin is supplied then the finished surface may not conform to the exact specifications required. In the latter instance too little resin will be available to penetrate to the metal surface and subsequent failure of torque testing will result. The exact amount can be arrived at empirically.

It has also been found to be advantageous to degas the resin prior to injection. This can be accomplished by applying a vacuum to the resin mixing device. The purpose of degasing the resin is to speed up the time to gel within the mold.

The resin can be mixed in a stationary vane mixer or other type of mixer. Within the mixer can be mixed the precise amount of resin and the precise amount of hardener which can be metered and mixed just prior to injection to produce the required amount of resin injected into the mold cavity.

In some instances, depending upon the identity of the resin, it has been found to be advantageous to preheat the resin prior to injection. This might be desirable to speed up the advancement of the resin to the gel stage and/or to increase the viscosity of the resin/hardener mixture. Using an epoxy resin as an example, preheat temperatures as high as about 230 degrees F. can be employed.

The next step in the process after pressure injecting the resin into the mold cavity is applying pressure to the ram of the mold or through a pump. When pressure is applied to the ram, it transfers its pressure to the resin to force the resin into the glass fiber winding around the entire area which has been wound with glass fibers to provide a uniform distribution.

A vacuum is applied to the mold through the vacuum slot, as shown in the drawings, prior to and during the time that pressure is being applied to the ram. It is continued during the advancement time to the gel stage. The vacuum evaluates air and any gases from the mold. Resin is inhibited from entering the narrow vacuum slot due to the surface tension of the resin. Application of the vacuum through the slot allows the evacuation of the injection area to take place in as little as 10 seconds depending upon the resin and temperature of the mold.

A hydraulic press or air bags or a pneumatic press with a toggle lockup system are the most common ways of closing the mold and applying and holding pressure to the ram and to the dies. The exact method used is not critical.

Heating of the mold is used to speed the advancement of the resin to the gel stage. The mold is kept closed with the ram at its farthest distance of travel as shown in FIG. 9 while cure to the gel stage takes place. The exact time to reach a gel stage will depend upon the nature of the resin, the amount of the hardener or curing agent, and the temperature during molding. It can be determined empirically from a gel time and temperature graph.

Higher temperatures produce faster gelling times. Preferably the temperature of gelling is kept as low as possible and still retain a fast gel cycle. This may seem like a contradiction, but if too high a temperature is used, there arises a problem of differences in expansion of fiber and metal. After cooling, when the metal contracts, there may not be a bond.

Best results with the "Epon" epoxy resin have been obtained using mold temperatures not higher than about 200 degrees F. at which temperature gelling takes place after about 3-6 minutes depending upon the amount of hardener used. While longer gel times can be used, the optimal gel time provides a good bond between the resin, fiber, and projectile body and at the same time reaches a gel condition in a fairly rapid period of time to reduce overall processing time.

The optimum conditions are desirably such that the gel time is long enough to provide a good metal to resin bond and at the same time short enough to reduce overall processing time. Gelling should be allowed to proceed only to the point where it is possible to open the mold and remove the projectile body without disturbing the surface of the newly formed gel.

As shown in the drawings, the split mold is provided with electric cartridge heaters which keep the mold at a constant temperature. A temperature which is not higher than about 200 degrees F. is preferred for injection with the "Epon" epoxy resin. Other resins may require temperatures as high as 260° F. for a rapid gel. It should be realized, however, that the exact temperature of the mold will depend upon the exact resin system being used and whether or not preheating of the fibers or resin/hardener mix is resorted to. No heating is required in some instances when ambient temperature curing resin/hardener systems are employed.

After the required gel state has been reached, the next step in the process comprises removing the projectile body from the mold. Cure can be completed at ambient temperature or the projectile can be followed by transferring it to a curing oven to cure the resin.

Normally, for the epoxy resin the final cure step in a curing oven takes approximately 45 minutes to about 60 minutes for the "Epon" resin at a temperature in the range of about 220 to about 230 degrees F.

Curing within the oven should be effected in such a manner as to protect the resin gel surface. This can be achieved by standing the projectile body upright on a conveyor type of arrangement or by hanging the projectile body within the oven. The exact method is not critical, as long as the laminated area is protected during the final stages of cure.

The final step of the process includes removing the projectile body from the curing oven followed by cooling of the projectile body.

If the projectile body has been molded to slightly less than the diameter of the projectile body then it is completely finished, requiring no further processing before use. The molded area is smooth and concentric with the adjacent metal surfaces of the projectile body but of a lesser diameter. No further machining of the surfaces is required as in prior art processes, but if desired, it can be painted or provided with other types of finish.

If the projectile body has been molded equal to or slightly greater than the diameter of the adjacent mold surfaces, then some machinery will be required to bring the molded area to required specifications.

Another advantage of the invention process is that less resin is required, reducing costs. Also, a greater proportion of fiber to resin is possible with laminates containing as much as 80% by weight of fiber to 20% by weight of resin. This provides increased strength over prior art laminates produced with pre-impregnated fibers. Furthermore, the use of a vacuum eliminates air bubbles to produce an extremely high quality strong laminate.

Furthermore, the process is much more rapid and can be adapted to be achieved in a single station or multistation manner, using the device as shown in FIG. 10 of the drawing. This permits the concurrent resin injection and molding of a multiplicity of projectile bodies at the same time depending on the size of the device. This results in greatly increased production over prior art methods, also resulting in reduced cost.

The Examples which follow are presented for the purpose of illustrating the invention and are not intended to constitute a limitation thereof.

EXAMPLE 1

A projectile body substantially as shown in FIG. 1 of the drawings is degreased by washing with a degreasing agent. It is then placed on a mandrel and rotated while precision winding the recess with glass fibers. The recess is about 0.0555 inch below the adjacent surfaces and extends to about 7 inches in length.

A creel is used to hold five forming packages, each forming package providing single strand roving. Each single strand roving is made up of M-type filaments having a diameter range of 0.00060-0.00065 inch. The glass fiber is formed of "E" glass and has the following specifications:

| E Glass Composition | |
|---|---|
| Compound | % By Weight |
| $B_2O_3$ | 5-10 |
| CaO | 16-25 |
| $Al_2O_3$ | 12-16 |
| $Si_2O$ | 52-56 |
| MgO | 0-5 |
| $Na_2O$ and $K_2O$ | 0-2 |
| $TiO_2$ | 0-0.8 |
| $Fe_2O_3$ | 0.05-0.4 |
| $F_2$ | 0-1.0 |

The glass fibers are supplied with a size which is compatible with epoxy resins. Other properties of the glass fibers include a Shore "O" hardness in the range of 50 to 90; Catenary in inches/50 feet, maximum of 1; Roving yield of 250 yards/lb.; Ignition loss, percent 0.05-1.50; Tensile strength, minimum of 200,000 p.s.i.; Horizontal shear strength after a 6-hour boil, minimum of 6,500 p.s.i.

The multiple strands of glass fibers are threaded through a ring of a precision winding machine of the classical helical/circumferential winder type with multi-axis capability. The recessed area of the projectile body is precision wound by rotation of the projectile body on the mandrel and movement of the ring and strands in a direction parallel to the longitudinal axis of the projectile body and with little or no twist to the strands. The ring follows a precise path back and forth to provide overlapping winding substantially normal to the longitudinal axis of the projectile body. At the same time the tension on the strands is controlled so that a precise amount of fibers are wound within the recess. The weight of the glass fibers amounts to 1.5 lbs.

Upon completion of the winding, which takes about 40 passes, the projectile body is removed from the mandrel and placed within a split mold as shown in the drawings and described herein. The mold is sprayed with a Teflon TM type release agent prior to emplacement of the projectile body. Heat supplied by electric cartridge heaters heats the mold to a maximum of 200 degrees F.

An epoxy type resin sold under the name "Epon Resin 9301" and a curing agent sold under the name "Epon Curing Agent" both from Shell Oil Company are blended together in a stationary vane mixer provided with a vacuum source to degas the resin mixture. The resin and curing agent are used in the amounts of 8 parts by weight of the curing agent to 100 parts by weight of the resin.

Upon emplacement of the projectile body within the split mold, the mold is closed, and a vacuum applied through the vacuum slot. After about 10 seconds, a measured amount of resin and curing agent are injected within the mold. The amount of resin used provides a final composite of 72% glass fiber and 28% resin by weight. Pressure in the amount of 25 p.s.i. is then applied to the ram which in turn transmits the pressure to the resin causing it to be forced throughout the recess and between the fiber interstices.

The mold is kept closed while the temperature of the mold is maintained just under 200 degrees F. During this period the vacuum is also maintained. Upon advancement of the resin to the gel stage which forms after about six and one-half minutes, the mold is then opened, and the projectile body is carefully removed without disturbing the glass fiber-gel surface.

The molded projectile body is then carefully placed within a curing oven which is at a temperature of 225 degrees F. After a period of 50 minutes the resin is completely cured. The resulting surface is very hard and smooth, being concentric with the adjacent outer surfaces but of 0.0312 inch less in diameter.

EXAMPLE 2

Substantially the procedure of Example 1 is repeated using 50 parts by weight of resin and 50 parts by weight of hardener which resin/hardener mix is preheated to about 230 degrees F. prior to injection into the mold. The mold is heated to and maintained at a temperature of 170 degrees F. and the mold time to the gel stage is 2½ minutes.

EXAMPLE 3

Substantially the procedure of Example 1 is repeated using S glass in place of the E glass, and employing 65 parts by weight of resin and 35 parts by weight of hardener which are preheated to about 230 degrees prior to injection into the mold. The mold is heated to a temperature of 190 degrees F. and the mold time to the gel stage is 4 minutes.

EXAMPLE 4

Substantially the procedure of Example 1 is repeated using 50 parts by weight of resin and 50 parts by weight of hardener which resin-hardener mix is preheated to about 230 degrees F. prior to injection into the mold.

The resin used is one available from Dow Chemical Corporation under the name "DER 330" (a low viscosity liquid epoxy of the bisphenol A-epichlorohydrin type having an epoxide equivalent weight of 177–188, a viscosity at 25 degrees C. of 7,000–10,000 CPS, a Gardner color Max of 3, and a weight of 9.7 lbs./gal.) with a curing agent, "ARCON H-D8" (2-ethyl hexioic acid salt of 2, 4, 6 tri(dimethylaminomethyl)phenol available from the Alled Resin Corporation used in the proportions of 100 parts by weight of rresin with 13.5 parts by weight of the curing agent.

The mold is heated to and maintained at a temperature of 180 degrees F. and the mold time to the gel stage is 1½ minutes.

EXAMPLE 5

Substantially the procedure of Example 1 is repeated using 50 parts by weight of resin and 50 parts by weight of hardener which resin/hardener mix is preheated to about 230 degrees F. prior to injection into the mold.

The resin employed is an epoxy resin available from E. V. Roberts and Associates under the tradename "RFC-1028" together with a curing agent available from Shell Chemical Company under the tradename "V-40" in the amount of 33 parts by weight of the curing agent to 100 parts by weight of the resin.

The mold is heated to and maintained at a temperature of 195 degrees F. and the mold time to the gel stage is 3 minutes.

EXAMPLE 6

Substantially the procedure of Example 1 is repeated using polyester fibers in place of the glass fibers and using a low viscosity alkyd resin. In addition, the proportions of resin and fiber used are 65% fiber and 35% resin.

EXAMPLE 7

Substantially the procedure of Example 1 is repeated using carbon fibers in place of the glass fibers.

EXAMPLE 8

Substantially the procedure of Example 1 is repeated using aramid fibers in place of the glass fibers and using a polyester resin.

EXAMPLE 9

Substantially the procedure of Example 1 is repeated using aramid fibers in place of the glass fibers and using a polyester resin.

EXAMPLE 10

Substantially the procedure of Example 1 is repeated to produce an appliance housing by using a thin, blow molded surface which is wound with glass fibers and emplaced into a split mold designed to exactly configure to the final dimensions. After epoxy resin injection, the mold is kept closed for six minutes. The molded part is removed without disturbing the gel surface. Cure of the molded part is finished within a curing oven. After cooling, the molded part is sawed into two symmetrical parts.

EXAMPLE 11

Substantially the procedure of Example 1 is repeated except that the resin is preheated to a temperature of 150 degrees F. and degassed with a vacuum. It is injected at a pressure of 45 p.s.i. This pressure is increased to 100 p.s.i. during the holding time in the mold. The mold is preheated to a temperature of 260 degrees F. Cure is completed at ambient temperature within 24 hours or less after molding. The molded composite is comprised of 77% glass and 23% resin.

Although the best mode contemplated for carrying out the invention has been hereinbefore shown and described, it will be apparent that various modifications will be obvious to those skilled in the art and may be made without departing from the spirit and scope of the invention as set forth in the following claims.

I claim:

1. A process for making a projectile which is impregnated with resin after winding with fibers in the absence of resin comprising:
providing a projectile for winding with dry fibers in the absence of resin;
providing dry fibers for winding in the absence of resin which are selected from the group consisting of glass, polyester, carbon, aramid, hybrids of carbon-aramid, hybrids of aramid-glass, hybrids of aramid-glass-carbon, and hybrids of carbon-glass and combinations thereof;
winding at least a portion of said projectile with dry fibers in the absence of resin;
providing a mold;
providing means for opening and closing the mold;
providing means for heating said mold;
providing vacuum means to said mold;
placing the dry fiber wound portion of said projectile into the mold;
closing said mold;
applying a vacuum to said mold;
providing a resin;
pressure injecting said resin into said mold to impregnate the fibers with the resin;
heating the mold to a temperature and for a time sufficient to cure the resin to the gel stage;
applying said vacuum to said mold prior to and during said pressure injection and heating steps of said process;
keeping said projectile within said mold for a time sufficient to cure the resin just to the gel stage whereby the object can be removed from said mold without disturbing the surface;
opening said mold;
removing said projectile from said mold; and,
allowing the resin to complete its cure.

2. A process for making a projectile body which is impregnated with resin after winding with fibers in the absence of resin comprising:
providing a projectile body of generally cylindrical shape and a longitudinal central axis and having a circumferential section recessed below its outer surface dimensions for winding with glass fibers in the absence of resin;
providing dry glass fibers for winding in the absence of resin;
providing dry glass fiber winding means;
winding dry glass fibers in the absence of resin around said recessed section to provide multiple layers of dry glass fibers within said recessed section;
providing a mold coextensive with said recessed section;
providing means for heating said mold;
placing said fiber wound portion of said projectile into said mold;
closing said mold;
applying a vacuum to said mold;
pressure injecting a measured amount of resin into said mold which is calculated to exactly fill the spaces between the mold surfaces, fiber layers, and the recessed section to provide upon mold closure and cure, a smooth molded surface;
heating said mold to a temperature and for a time sufficient to cure the resin to the gel stage whereby the projectile can be removed without disturbing the molded surface;
wherein said vacuum is applied to said mold prior to and during said pressure injection and heating steps of said process;
removing said projectile from said mold; and,
completing cure at ambient temperature.

3. A process as claimed in claim 2 further comprising:
providing said glass fiber winding means with a precision winding capability to permit precision winding of glass fibers parallel to adjacent fibers, each winding at the same time being substantially normal to the longitudinal central axis of the projectile body.

4. A process as claimed in claim 3 further comprising:
providing means for heating said fibers during winding; and,
heating said fibers during winding.

5. A process as claimed in claim 3 further comprising:
providing means for heating said resin during injecting; and,
heating said resin during injecting.

6. A process as claimed in claim 3 wherein said resin is a thermoset type resin.

7. A process as claimed in claim 6 wherein said resin is an epoxy type resin.

8. A process as claimed in claim 7 wherein said proportions of fiber and resin comprise about 50% to about 80% by weight fiber and about 50% to about 20% by weight resin; and,
wherein a portion of said mold has an interior dimension which is concentric with and of a lesser diameter than said projectile body outer surfaces lying above and below said recessed section.

9. A process according to claim 1 for making a projectile which is impregnated with resin after winding with fibers in the absence of resin further comprising:
transferring said projectile from said mold to a curing oven;
heating said projectile to a temperature and for a time sufficient to cure said resin;
removing said projectile from said curing oven; and,
cooling said projectile.

* * * * *